United States Patent
Heffels et al.

[11] Patent Number: 6,156,120
[45] Date of Patent: Dec. 5, 2000

[54] APPARATUS FOR THE UNIFORM DISTRIBUTION OF A SMALL AMOUNT OF LIQUID ON BULK MATERIALS

[75] Inventors: Stefan Heffels, Eppstein; Johannes Hartel, Bad Soden; Gerhard Nöltner, Frankfurt am Main; Peter Mischke, Bad Soden, all of Germany

[73] Assignee: Aventis, Germany

[21] Appl. No.: 08/639,713

[22] Filed: Apr. 29, 1996

Related U.S. Application Data

[63] Continuation of application No. 08/200,747, Feb. 23, 1994, abandoned.

[30] Foreign Application Priority Data

Feb. 25, 1993 [DE] Germany ............... 43 05 713

[51] Int. Cl.⁷ .................................................. B05C 5/00
[52] U.S. Cl. ............................................. 118/56; 118/303
[58] Field of Search ................ 118/19, 56, 303, 118/313, 320, 300, 417, DIG. 5; 239/102.1, 102.2

[56] References Cited

U.S. PATENT DOCUMENTS

| | | | |
|---|---|---|---|
| 3,451,375 | 6/1969 | Martin | 118/19 |
| 3,542,291 | 11/1970 | Hughes | 239/102 |
| 3,667,679 | 6/1972 | Wiesenberger | 239/102 |
| 4,129,666 | 12/1978 | Wizerkaniuk | 118/303 |
| 4,245,580 | 1/1981 | Okawara | 118/19 |
| 4,272,234 | 6/1981 | Tse | 118/19 |
| 4,465,017 | 8/1984 | Simmons | 118/19 |
| 4,581,242 | 4/1986 | Forster | 118/19 |
| 4,686,115 | 8/1987 | Majer | 118/19 |
| 4,709,709 | 12/1987 | Jünemann et al. | |
| 4,725,446 | 2/1988 | Forster et al. | 118/19 |
| 4,740,390 | 4/1988 | Külling | 118/303 |
| 4,766,839 | 8/1988 | Dunajtschik | 118/303 |
| 5,087,475 | 2/1992 | Bazin et al. | 118/303 |
| 5,306,478 | 4/1994 | Hayati et al. | 423/279 |

FOREIGN PATENT DOCUMENTS

| | | |
|---|---|---|
| 0 225 237 | 6/1987 | European Pat. Off. |
| 2003986 | 2/1971 | Germany |
| 1917387 | 2/1976 | Germany |
| 2842232 | 4/1980 | Germany |
| 3014741 | 10/1981 | Germany |
| 3401847 | 8/1985 | Germany |
| 3913384 | 10/1990 | Germany |
| 1704847 | 1/1992 | Russian Federation |
| 1008805 | 11/1965 | United Kingdom |
| 1015962 | 1/1966 | United Kingdom |

Primary Examiner—Steven P. Griffin
Attorney, Agent, or Firm—Connolly & Hutz

[57] ABSTRACT

The present invention relates to an apparatus for the uniform distribution of a small amount of liquid on bulk materials. The method is performed by spraying the liquid with at least one ultrasonic nozzle onto the bulk material, which is finely particulate. The spraying may occur before, during, or both before and during, mixing the particulate solid in a mixing apparatus. Dust may be significantly reduced by the apparatus of the instant invention, and the apparatus is useful for applying not only liquids, but emulsions, solutions, dispersions, or melts. The mixer may be mechanical or pneumatic.

10 Claims, 1 Drawing Sheet

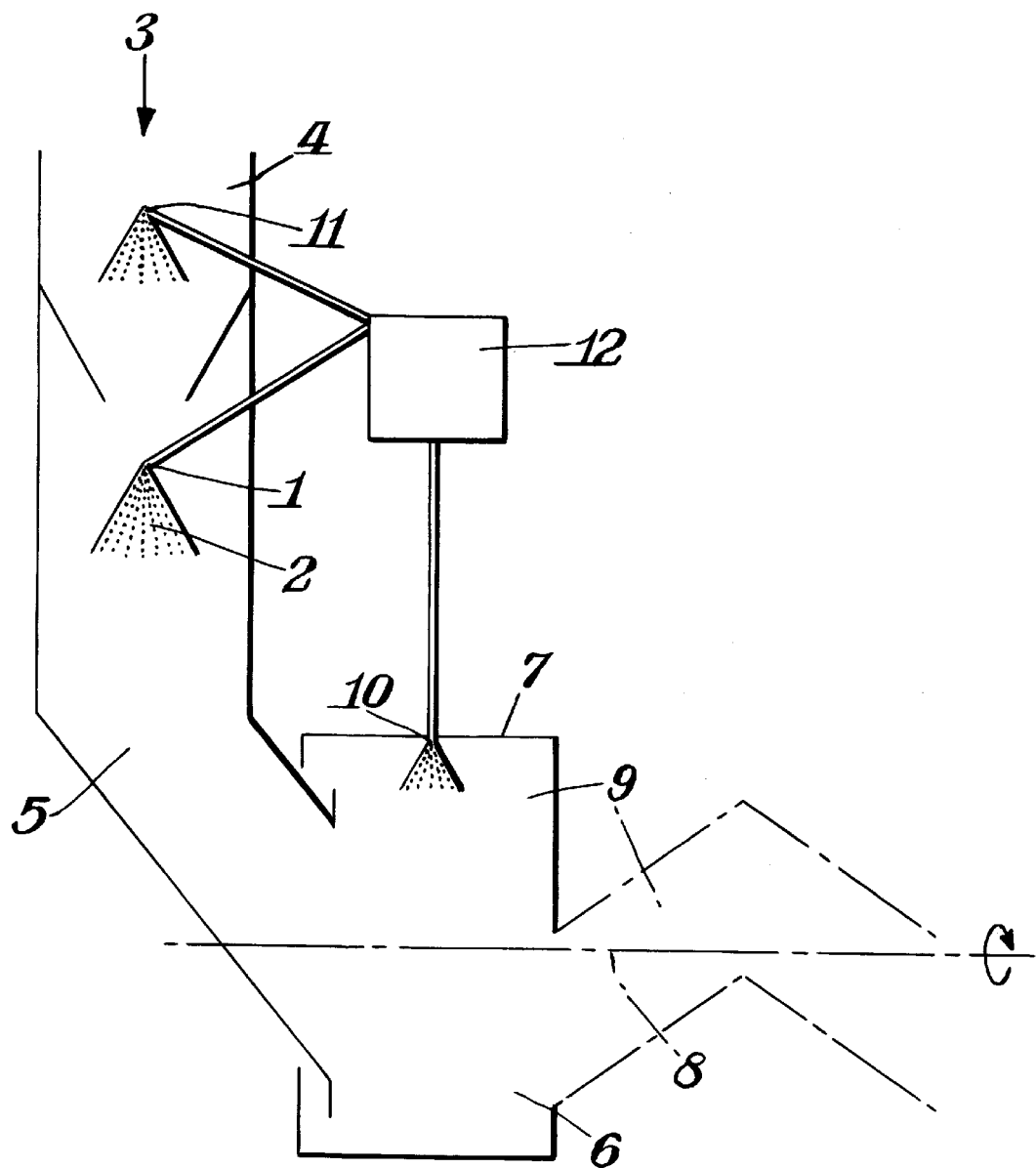

APPARATUS FOR THE UNIFORM DISTRIBUTION OF A SMALL AMOUNT OF LIQUID ON BULK MATERIALS

This application is a continuation of application Ser. No. 08/200,747 filed on Feb. 23, 1994, now abandoned.

BACKGROUND OF THE INVENTION

A uniform distribution of a small amount of a liquid adjuvant on granular materials and finely particulate solids may be carried out, for example, to increase the solubility, to accelerate reaction and dissociation processes after suspension in solution, to improve the dispersability, the flow properties, the optical properties and to improve the taste and smell, to protect against humidity, oxygen, bacterial or fungal attack or for binding dust. Particularly in the case of granular dyes and dye powders, non-dusting behavior and flow behavior are becoming increasingly significant as quality parameters.

Processing a liquid adjuvant has the advantage, compared to an adjuvant in solid form, that liquid adjuvants are easier to distribute and that, because of the possibility of dilution, they can be applied in a controlled manner in extremely low concentrations.

Instead of admixing the granular material or the powder homogeneously with a liquid adjuvant it is possible to achieve the same effect, using a smaller amount of liquid adjuvant, by means of subsequent coating by spraying. On the grounds of product purity and cost minimization, too, the aim is to use an small amounts as possible of liquid adjuvants for coating and to distribute these as uniformly as possible.

In all applications, the quality of the coating depends on the dosage of the substances employed, the arrangement and construction of the feed device, the distribution of the coating agent, the mixing and the homogenization of the bulk material to be treated.

DESCRIPTION OF THE PRIOR ART

In many known apparatuses, granulating, drying and coating is carried out in a fluidized bed, simultaneously or in sections. The introduction and uniform distribution of a liquid adjuvant is preferentially carried out by means of nozzles. The smallest unary nozzles, for effective and uniform atomization, require a throughput of at least 0.014 l/h. At this throughput, the nozzle has a bore of 0.1 mm and requires a liquid pressure of at least 5 bars in the case of water. Nozzles of this bore are extremely sensitive to solid impurities. Liquids having a higher viscosity require a correspondingly higher liquid pressure. For small throughputs, binary and ternary nozzles are therefore employed preferentially. The disadvantage in all these polynary nozzles is, however, that an atomizer gas stream is produced as exhaust air. Together with the exhaust air produced, a part of the liquid adjuvant also often escapes in the form of vapor or extremely fine droplets. In many cases deposits form as a result on the conduits to the filter or gas scrubber. Sometimes theme deposits of oil and dust lead to blockage of the filters. It was found, for example, by an analysis that, when hexylene glycol was sprayed onto granular materials in a fluidized bed, up to 30% of the hexylene glycol employed escaped into the exhaust air past the granular material.

In those cases in which only amounts larger than required for treating the bulk material could be sprayed, provision was made for cyclic infeed. When the unary nozzles were started up and shut down, a flickering spray pattern with an uneven distribution often arose. At the same time, the subsequent mixing time and mixing intensity had to be chosen to be sufficiently long. Agglomerations and agglutinations often formed. This in turn required the bulk material treated to be screened.

SUMMARY OF THE INVENTION

The object of the present invention is to provide a method and apparatus for the uniform distribution of a small amount of liquid on bulk materials, which overcome these drawbacks of the prior art.

We have found that, when an ultrasonic nozzle is employed in combination with a mixer, surprisingly a particularly uniform distribution of liquids onto the surface of finely particulate solids is achieved, the use of a very small amount of the liquid adjuvant being sufficient to obtain the desired characteristics of the treated solid particles.

The present invention relates to a method for the uniform distribution of a small amount of liquid onto the surface of finely particulate solids, which comprises spraying said liquid by means of at least one ultrasonic nozzle onto the finely particulate solid to be treated, before or while, or before and while, said solid is mixed in a mixing appliance.

DESCRIPTION OF THE DRAWING

The invention may be understood by reference to the FIGURE.

Ultrasonic atomizer 1 sprays liquid 2 onto the particulate medium 3 as it travels through the apparatus via conveyor 4. The spraying occurs in area 5. The particulate medium enters container 6 having walls 7 according to the present invention. V-type mixer 8 having mixing tools 9 ensures uniform distribution. Optionally, the particulate medium may be sprayed at location 10, proximate to the mixing tools, or 11, at a maximum distance from the mixing tools. The nozzles are fed from liquid feed device 12.

The particle size of the finely particulate solids can be chosen at will; for example, the method according to the invention can be applied to granular materials, powders or dusts.

In the case that the liquid adjuvant is employed for deducting, fine-grained particles produced by abrasion or fracture are also bound, since the liquid adjuvant located on the surface of the particles has an adhesive effect. Expediently, however, the proportion of dust is minimized by optimal granulation and systematic removal of dust, e.g. by classifying or screening, even before the spray treatment.

Finely particulate solids which can be treated according to the method according to the invention include, for example, granular dyes, dye powders, pesticides, pharmaceuticals, detergents, detergent additives, washing aids veterinary products, ceramic products, seed, salt for roads, grit, food, preservatives and hair dyes.

The liquid sprayed onto the finely particulate solid can be a mineral oil, a vegetable oil or a mixture of vegetable oils, preferably vegetable oils which are liquid at room temperature, a glycol, preferably diethylene glycol or hexylene glycol, an oxalkylate, preferably an ethylene oxide polymer, a propylene oxide polymer or an ethylene oxide/propylene oxide block polymer, glycerol, a glycerol ether, a glycol ether, preferably fatty alcohol polyglycol ether, a fatty amino, for example dialkyllaurylamine or a mixture of one or more of the liquids mentioned above.

An oil-water emulsion, for example a mineral oil emulsion, a melt, an aqueous solution or a dispersion of a compound suitable for surface coating, for example an acrylate, a dye or a catalytically active substance in one or more of the liquids mentioned can likewise be sprayed according to the process according to the invention. Instead of water, an organic solvent can be used alternatively. On ecological grounds, water is preferred, however. If a dispersion is sprayed, the particle size of the dispersed solids must be less than 500 µm, preferably less than 100 µm, for the ultrasonic nozzle not to become blocked. For example, a dispersion or a solution of a fungicide, bactericide or insecticide can be sprayed onto a solid which is to be protected against attack by fungi, bacteria or pests.

Further examples of compounds which are preferentially sprayed as an aqueous solution according to the method according to the invention are poly(vinyl alcohol), carboxymethylcellulose, methylcellulose, alginate, cellulose acetate, ethyl monochloroacetate, poly(vinyl acetate), poly (vinylidene chloride), poly(vinylpyrrolidone), antioxidants such as ascorbic acid esters, antiirritants such as fatty acid alkylol amides, antistatics such as fatty amine oxides, fragrances, optical brighteners, additives for bath preparations, chelate formers such as aminopolycarbonic acids, disinfectants, dispersants such as soya lecithin, tablet coatings, amphoteric, anionic, cationic or nonionic emulsifiers such as fatty amine salts, fatty alcohols which may be ethoxylated or propoxylated, fatty acid alkyl amides, fatty acid esters or fatty acids, film formers, gel formers, odor maskants, hair conditioners, resins, preservatives, corrosion inhibitors, lecithins, solubilizers, wetting agents, antifoaming agents, sweet substances, sweeteners, tablet adjuncts, thickeners, waxes, washing raw materials and softeners.

The amount, required for the purpose according to the invention, of the liquid to be sprayed onto the surface of the finely particulate solid in from 0.001 to 15% by weight, preferably from 0.01 to 1% by weight, based on the weight of the finely particulate solid employed. The liquid adjuvant can be applied at a temperature of from 0 to 100° C., preferably at from 20 to 40° C. The liquid adjuvants mentioned above can be sprayed individually, as a mixture with one another or as a mixture with water or an organic solvent. The application of a larger amount of the liquid adjuvant than stated above is technically possible, but inexpedient, as the flow behavior and the flow characteristics of the bulk materials thus treated are impaired.

The present invention also relates to an appliance for the uniform distribution of a small amount of liquid onto the surface of finely particulate solids, wherein at least one ultrasonic nozzle is combined with a mixing device.

Possible ultrasonic nozzles to be used are conventional ultrasonic atomizers which have a treatment liquid throughput of from 2 g/h to 100 kg/h, preferably from 20 g/h to 800 g/h.

A conventional ultrasonic atomizer suitable for the purpose of the invention comprises three parts: an oscillator, an electromechanical transducer and a liquid container for the liquid to be sprayed. In the electromechanical transducer there are generated, from the electrical waves generated in the oscillator, mechanical vibrations by means of piezoceramic elements. As a result, the surface of the spray liquid is excited into extremely fine capillary waves, on which droplets are pinched off and flung away in parabolic trajectories. To this end, the liquid film must be distributed on the atomizer surface with a certain layer thickness. The liquid is replenished without using pressure. The maximum amount sprayed can be up to 100 l/h. The operating frequency is in the low ultrasonic range between 20 and 100 kilohertz.

Ultrasonic atomizers exist in various constructional embodiments, e.g. as axial or as circular ultrasonic atomizers. For the method according to the invention, an ultrasonic axial atomizer is preferred which generates a liquid jet in the form of a slender solid cone having an angle of from 10 to 200°, preferably from 10 to 50°, especially preferably from 10 to 20°, operates at a frequency of from 20 to 100 kHz, preferably at 60 kHz, and generates a droplet spectrum whose maximum of the relative frequency distribution is between 15 and 25 μm.

Possible mixing devices include mechanical or pneumatic mixers. Of the mechanical mixers, those are preferred in which no gases are blown off or drawn off. Commercial mixers exist in the form in which the bulk material container rotates about one or more axes, for example a tubular rotary mixer, a tumble dryer, a double-cone dryer or a V-type mixer. Alternatively, the containers may be fixed, and the mixing of the solids is caused by moving mixing tools, for example a Schugi mixer, a turbulent mixer or a plow mixer. Pneumatic mixers such as, e.g. an air-mix mixer are, however, likewise suitable for the purpose of the present invention. Particular preference is given to tubular rotary mixers, turbulent mixers and plow mixers.

The mode of operation of the mixer can be discontinuous or, advantageously, continuous.

The ultrasonic nozzle may be arranged in or near the mixer inlet to obtain as compact a design as possible. Particularly in the case of continuously operating mixers, the ultrasonic nozzle may also be mounted in an inlet pipe, on a dosing chute, on a conveyor belt or on a hopper, in order to spray downwards from above. Particularly in the case of discontinuous operation it is advantageous to arrange the ultrasonic nozzle in the interior of the mixer at as large a distance as possible from the mixing tools and the vessel walls.

The ultrasonic nozzle can be fed with the treatment liquid by means of a suitable pressure-generating appliance, for example by a pump, preferably by a peristaltic pump, gear pump, piston pump, or solely via a pressure vessel by hydrostatic pressure, the liquid flowing to the nozzle without pressure being applied and only the pressure drop in the feeder having to be overcome.

Dosing of the solid to be treated into the mixer is effected, for example, by a vibrating conveyor, screw conveyor, table feeder, rotary-tube conveyor, belt conveyor, star feeder or another suitable dosing appliance.

The present invention also relates to the use of an ultrasonic nozzle in combination with a mixing appliance for the uniform distribution of a small amount of liquid onto the surface of finely particulate solids.

By means of the method according to the invention, it is possible to reduce significantly the amounts required of the liquid adjuvant to be sprayed, compared to the prior art. This results in considerable cost saving and in minimizing pollution. These advantages had not been recognized in the conventional applications of an ultrasonic nozzle.

From the comparison of the use of an ultrasonic nozzle and a conventional binary nozzle, further advantages result for the ultrasonic nozzle:

- an atomizer gas can be dispensed with, and exhaust-air problems are thus avoided;
- the ultrasonic nozzle can be started up and shut down without coarse drops being formed, in contrast to the binary nozzle;
- no whiskers are formed, as the ultrasonic nozzle is self-cleaning, owing to the oscillating body;

the improved distribution of very small amounts makes it possible to shorten the mixing time and save costs in the further secondary treatment of the particles, for example more rapid solubility;

the improved distribution leads to an increase in the product quality and purity.

The following examples serve to illustrate the invention and do not limit its scope. Percentages refer to percent by weight.

The term "filter value" is an assessment of the dusting behavior of dyes. What in assessed is the discoloration of a filter in the exhaust line of a container into which, from a height of approximately 1 m an amount of 10 g of a granular dye has dropped through a downpipe. This measuring apparatus is standardized among dye manufacturers. A filter value of 5 means dust-free whereas 1 means strongly dusting (Berger-Schunn et al., Melliand Textilberichte 9 (1989) 690–692 and Textilveredlung, 24 (1989), 277–289). The ultrasonic nozzle employed in the examples is an ultrasonic axial atomizer having an overall length of 35 mm, which generates a liquid jet in the form of a slender solid cone having an angle of 15°, operates at a frequency of 60 kHz and generates a droplet spectrum whose maximum of the relative frequency distribution is at 20 $\mu$m.

EXAMPLE 1

Deducting of Dyes in a Zigzag Mixer

The granular dyes listed in the following table were treated with hexylene glycol as a deducting agent. The dyes employed had been dried, granulated and classified in a fluid spray dryer.

TABLE 1

Dedusting of dyes by means of an ultrasonic nozzle

| Granular dye | Filter value before spraying | Filter value after spraying | Hexyleneglycol content % | Throughput through the ultrasonic nozzle g/h |
|---|---|---|---|---|
| a) Dye of the following formula | 2 | 3 | 1.0 | 760 |
| b) Dye disclosed by EP-A-0,028,788, Ex. 1 | 3 | 4–5 | 0.5 | 390 |
| c) C.I. Reactive Blue 19 | 3–4 | 5 | 0.011 | 20 |
| d) Dye disclosed by EP-A-0,032,187, Ex. 1 | 3–4 | 5 | 0.011 | 20 |

$$HO_3S-O-CH_2-CH_2-SO_2-\underset{H_3C}{\overset{OCH_3}{\bigcirc}}-N=N-\underset{HO}{\overset{H_3C}{\bigcirc_N^N}}-\bigcirc-SO_3H$$

The design of a commercial tubular rotary (zigzag) mixer was modified. The originally provided blade-shaped mixing tools in the antechamber were removed. Instead of these an ultrasonic nozzle was fitted. The nozzle was fed by means of a peristaltic pump in order to be able to achieve even small throughputs in the order df magnitude of 10 g/h. The granular dye was dosed into the zigzag mixer by means of a vibration conveyor (approximately 100 kg/h) through an inclined conduit. The rotational speed of the mixer was 0.32/s.

The covering on the head of the nozzle and on the wall of the mixer was loose and dry. It did not build up during the time of the experiment.

The filter values were determined on the basis of 10 g samples taken at different times at the outlet of the mixer. It was noticed, surprisingly, that the filter values of a plurality of samples of one and the same dye were identical. This again confirms the uniformity with which very small amounts of liquid could be sprayed onto a granular material. Nor was it necessary any longer to screen large agglomerates or lumps.

The following amounts of hexylene glycol, based on the total weight of the bulk material, were sufficient to produce free-flowing low-dust to dust-free granular materials:

COMPARATIVE EXAMPLE 1

Atomizer Disc in a V-Type Mixer a) 3.5 kg of the dye (granules) disclosed by EP-A-0,032,187, Example 1, were moistened in a V-type mixer (volume 10 l) with 1% of hexylene glycol. The filter value of the product employed was 2–3. The liquid entered the container through a tubular shaft and an annular gap of 0.2 mm between two mounted flanges. The shaft rotated at 15/s, and the container rotated at 0.5/s. On the shaft, small blades were located which at the high rotational speed caused turbulence and accelerated mixing. The V-type mixer, owing to its similar construction, has the same mixing technique as a zigzag mixer. A few lumps having a size of approximately 1 cm formed during the experiment. The filter value after the treatment was 2–3 and had hardly improved, nor did a variation in the mixing time between 3 and 12 minutes result in any significant improvement.

b) When treating C.I. Reactive Blue 19 granules, it was possible, employing as little as 0.5% of hexylene glycol, to avoid the formation of lumps, but the filter value improved only insignificantly from 2–3 to 3.

COMPARATIVE EXAMPLE 2

Binary Nozzle in a Fluidized Bed

Various granular dyes were moistened on a fluidized bed of 0.3 m² and a fluidized bed height of 0.11 m (bulk material height of 0.07 m) by spraying on hexylene glycol by means of a binary nozzle. The residence time was approximately 20 min and the gas inlet temperature was 26° C. The solids throughput was 30 kg/h. To improve the filter value from 3–4 to 5, C.I. Reactive Blue 19 required 1.5% by weight of hexylene glycol, and the dye disclosed by EP-A-0,032,187 required 2% by weight of hexylene glycol (600 g/h). The pourability was significantly poorer than in the case of a treatment according to Example 1. The amount of hexylene glycol required, too, was many times larger than with an ultrasonic nozzle according to Example 1.

COMPARATIVE EXAMPLE 3

Binary Nozzle in a Zigzag Mixer

In the same arrangement as in Example 1, C.I. Reactive Blue 19 was deducted by means of a binary nozzle from Schlick and in a further experiment by means of a binary nozzle from Lechler, using hexylene glycol. To achieve a filter value 5, a degree of oiling of 0.024% (0.055 kg/h) was necessary. The amount is twice as large as by means of an ultrasonic nozzle (see Table 1).

Commercial binary nozzles have the drawback that the liquid to be sprayed on is discharged with the spray gas from the bulk material, particularly from finely particulate bulk material.

EXAMPLE 2

Dedusting of Dyes in a Downpipe with a Melt

Spraying was carried out in an 8" zigzag mixer without a chopper and with an ultrasonic nozzle. In order to achieve a uniform discharge and mixing process, the mixer was lifted by 2.4° on the feed side. The nozzle was fitted into the inlet in a vertical inlet pipe upstream of the drum of the mixer, approximately 100 cm above the bend.

Dedusting of reactive-dye granules was effected by means of a fatty alcohol polyglycol other which has a melting point above 60° C. At a rotational speed of 0.32/s and at a granular-material throughput of approximately 80 kg/h, 20 g/h of the fatty alcohol polyglycol other were introduced at a temperature of 90° C. After so-called hot dedusting in the zigzag mixer, the product was discharged at 65° C. The filter value improved from 3 to 4, which means that a virtually dust-free granular material was obtained.

We claim:

1. An apparatus for the uniform distribution of a small amount of a liquid onto the surface of finely particulate solids, comprising:

a mixer having an associated inlet for introducing the finely particulate solids downwardly into the mixer and at least one ultrasonic nozzle, said at least one nozzle having a throughput of the liquid of from 2 g/h to 800 g/h and being mounted vertically in a vertical inlet pipe such that the nozzle sprays downward from above the mixer, said nozzle further being connected to a feed device providing the liquid under pressure.

2. The apparatus as claimed in claim 1, wherein the at least one ultrasonic nozzle is an ultrasonic axial atomizer which generates a liquid jet in the form of a slender solid cone having an angle of from 10 to 20°, operates at a frequency of from 20 to 100 kHz, and generates droplets having a maximum droplet size of between 15 and 25 μm.

3. The apparatus as claimed in claim 1, wherein the mixer is a mechanical or pneumatic mixer.

4. The apparatus as claimed in claim 1, wherein the liquid is present in an amount of from 0.01 to 1% by weight, based on the weight of the solid present.

5. The apparatus as claimed in claim 1, wherein the feed device is a pump.

6. The apparatus as claimed in claim 5, wherein the pump is a peristaltic pump, a gear pump, or a piston pump.

7. The apparatus as claimed in claim 1, wherein the feed device is a pressure vessel.

8. The apparatus as claimed in claim 1, wherein the at least one ultrasonic nozzle is an ultrasonic axial atomizer which generates a liquid jet in the form of a cone having an angle of from 10 to 50°, operates at a frequency of from 20 to 100 kHz, and generates droplets having a maximum droplet size of between 15 and 25 μm.

9. The apparatus as claimed in claim 1, wherein the at least one ultrasonic nozzle is an ultrasonic axial atomizer which generates a liquid jet in the form of a cone having an angle of from 10 to 50°, operates at a frequency of 60 kHz, and generates droplets having a maximum droplet size of between 15 and 25 μm.

10. The apparatus of claim 1, wherein the mixer is a zigzag mixer.

* * * * *